United States Patent [19]

Beck et al.

[11] Patent Number: 5,182,720
[45] Date of Patent: Jan. 26, 1993

[54] APPARATUS FOR CONTROLLING AND MONITORING A LUBRICATING SYSTEM

[75] Inventors: David C. Beck, St. Ann, Mo.; Philip M. Gundlach, Jr., Highland, Ill.

[73] Assignee: McNeil (Ohio) Corporation, St. Paul, Minn.

[21] Appl. No.: 871,573

[22] Filed: Apr. 20, 1992

Related U.S. Application Data

[63] Continuation of Ser. No. 623,205, Dec. 6, 1990, abandoned.

[51] Int. Cl.$^5$ .......................... F01M 1/18; F01M 1/16
[52] U.S. Cl. .................................. 364/509; 364/550; 364/424.03; 184/108
[58] Field of Search ............... 364/550, 551.01, 551.02, 364/509, 510, 506, 424.03, 424.04; 340/438, 439, 606; 137/486, 487.5, 468; 184/1.5, 3.2, 6.1, 6.15, 6.22, 6.4, 7.3, 7.4, 103.1, 103.2, 108

[56] References Cited

U.S. PATENT DOCUMENTS

| | | | |
|---|---|---|---|
| 4,064,455 | 12/1977 | Hopkins et al. | 324/61 R |
| 4,315,523 | 2/1982 | Mahawili et al. | 137/486 |
| 4,326,603 | 4/1982 | Darrow et al. | 184/6.1 |
| 4,445,168 | 4/1984 | Petryszyn | 364/140 |
| 4,642,614 | 2/1987 | Cook | 340/608 |
| 4,726,448 | 2/1988 | Schroeder et al. | 184/3.2 |
| 4,933,852 | 6/1990 | Lemelson | 364/424.03 |
| 4,967,882 | 11/1990 | Meuer et al. | 184/7.4 |

OTHER PUBLICATIONS

Hart et al, "A Formal Basis for the Heuristic Determination of Mininum Cost Paths", IEEE Trans. Science & Cybernetics, vol. SSC-4, No. 2, Jul. 1968 pp. 100-107.
Imai et al, "Practical Effects of Existing Shortest Path Algorithms and a New Bucket Algorithm"; J of operations Rsch Soc. Japan, vol. 27, No. 1 Aug. 1984, pp. 43-57.
Knuth, *The Art of Computer Programming vol. 3 Sorting & Searching,* (Addison-Wesley 1973).
R. Cooper et al, "The Average Time Until Bucket Overflow", ACM Trans Database Sys, vol. 9, No. 3, Sep. 1984 pp. 392-408.

*Primary Examiner*—Parshotam S. Lall
*Assistant Examiner*—Collin W. Park
*Attorney, Agent, or Firm*—Senniger, Powers, Leavitt & Roedel

[57] ABSTRACT

An apparatus for controlling and monitoring a lubricating system having analog sensors and switches indicating the status of the lubricating system. An analog-to-digital converter is responsive to the analog sensors and switches and provides a plurality of digital sensing signals representative of the status of the lubricating system. A provided memory includes a nonvolatile memory for storing instructions. By using a keypad, an operator selects and inputs parameters into the nonvolatile memory. A microprocessor processes the digital sensing signals in accordance with the parameters stored in the nonvolatile memory. Relays are responsive to the microprocessor and initiate lubrication of the lubricating system. A display, responsive to the microprocessor, indicates the status of the lubricating system.

23 Claims, 15 Drawing Sheets

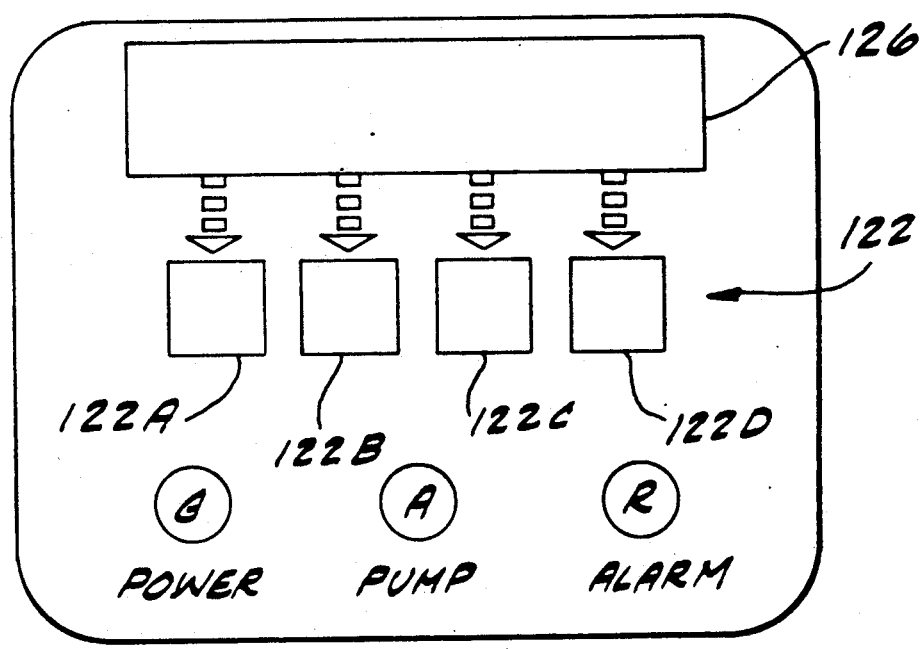

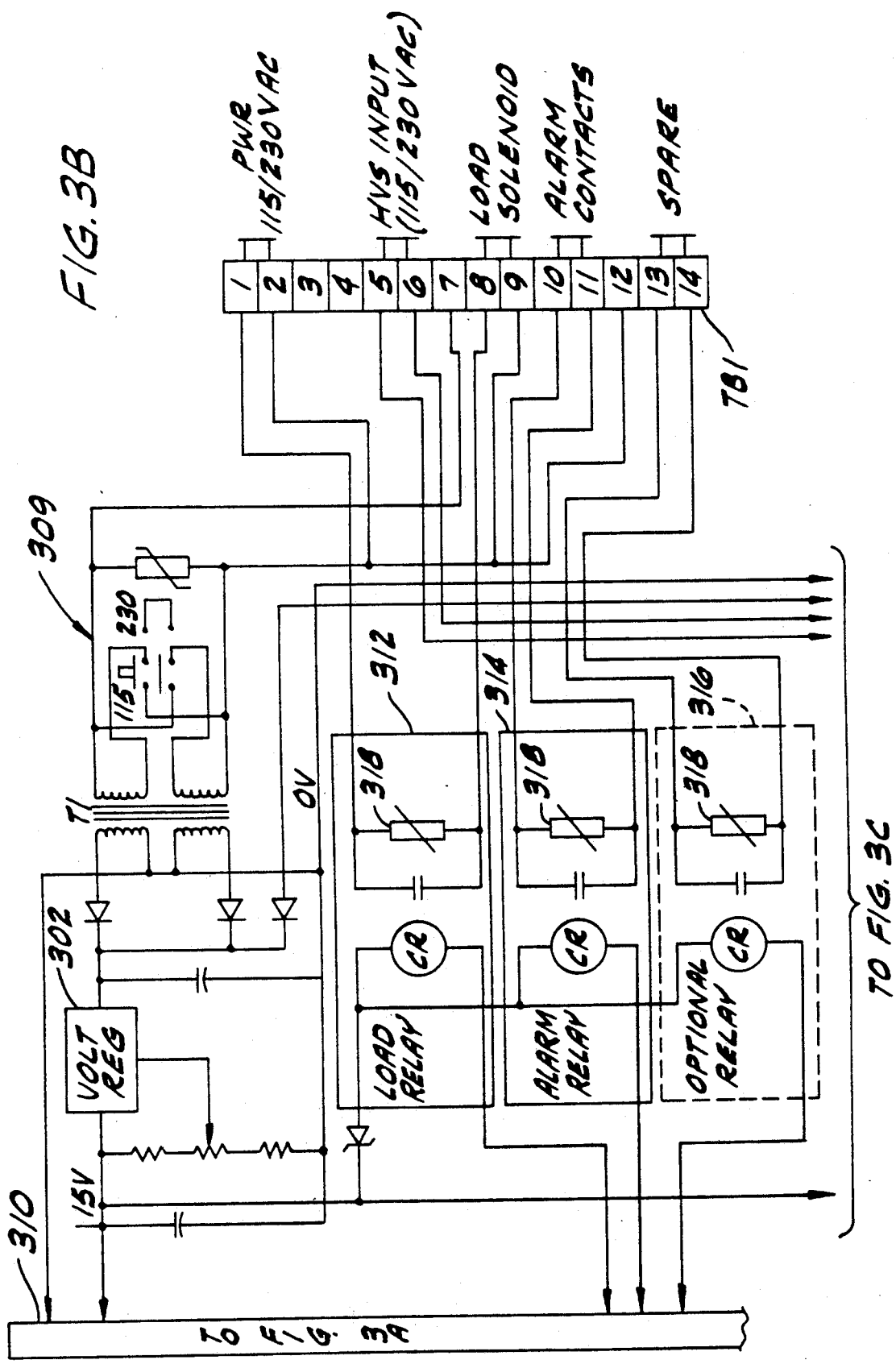

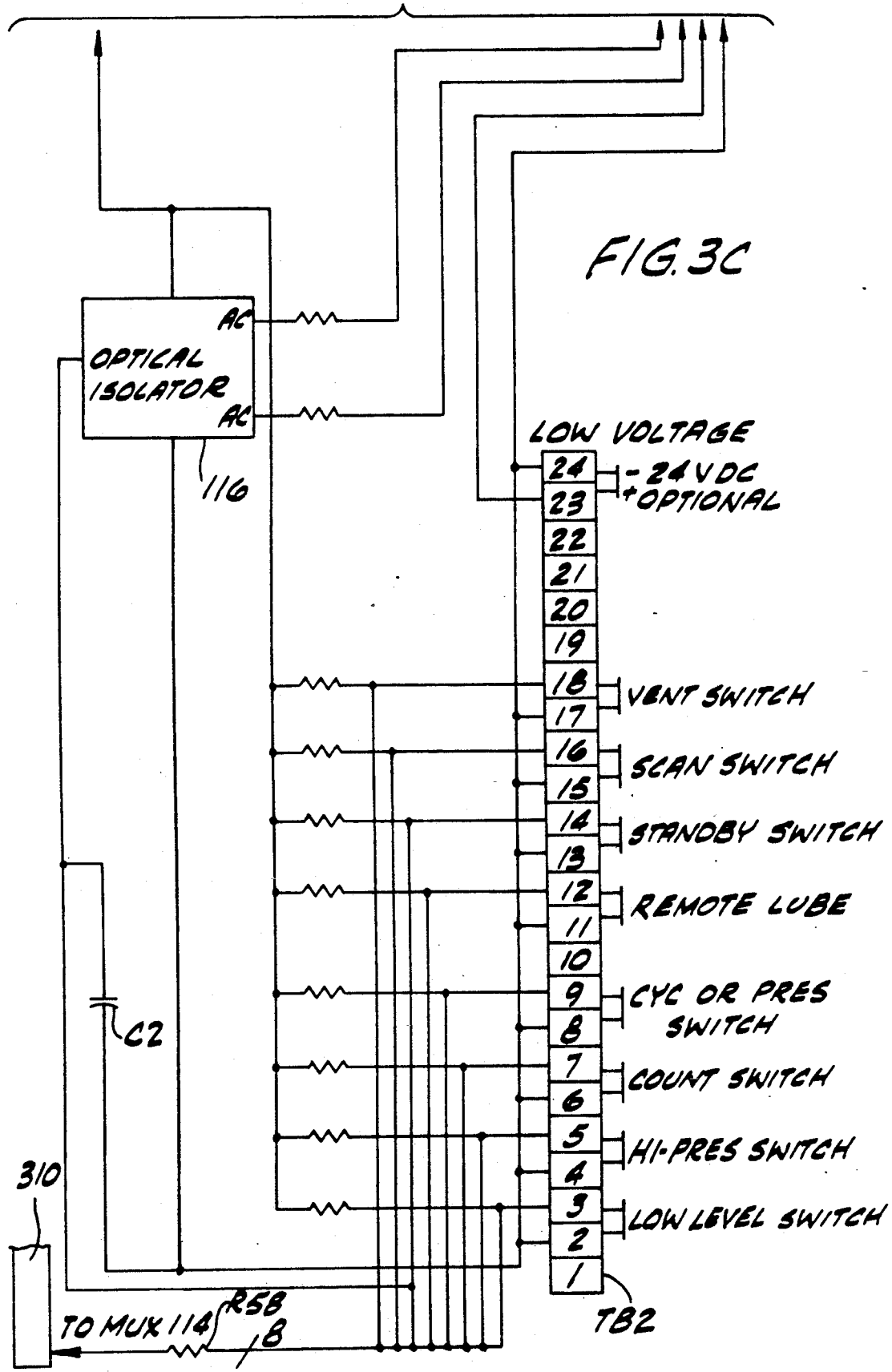

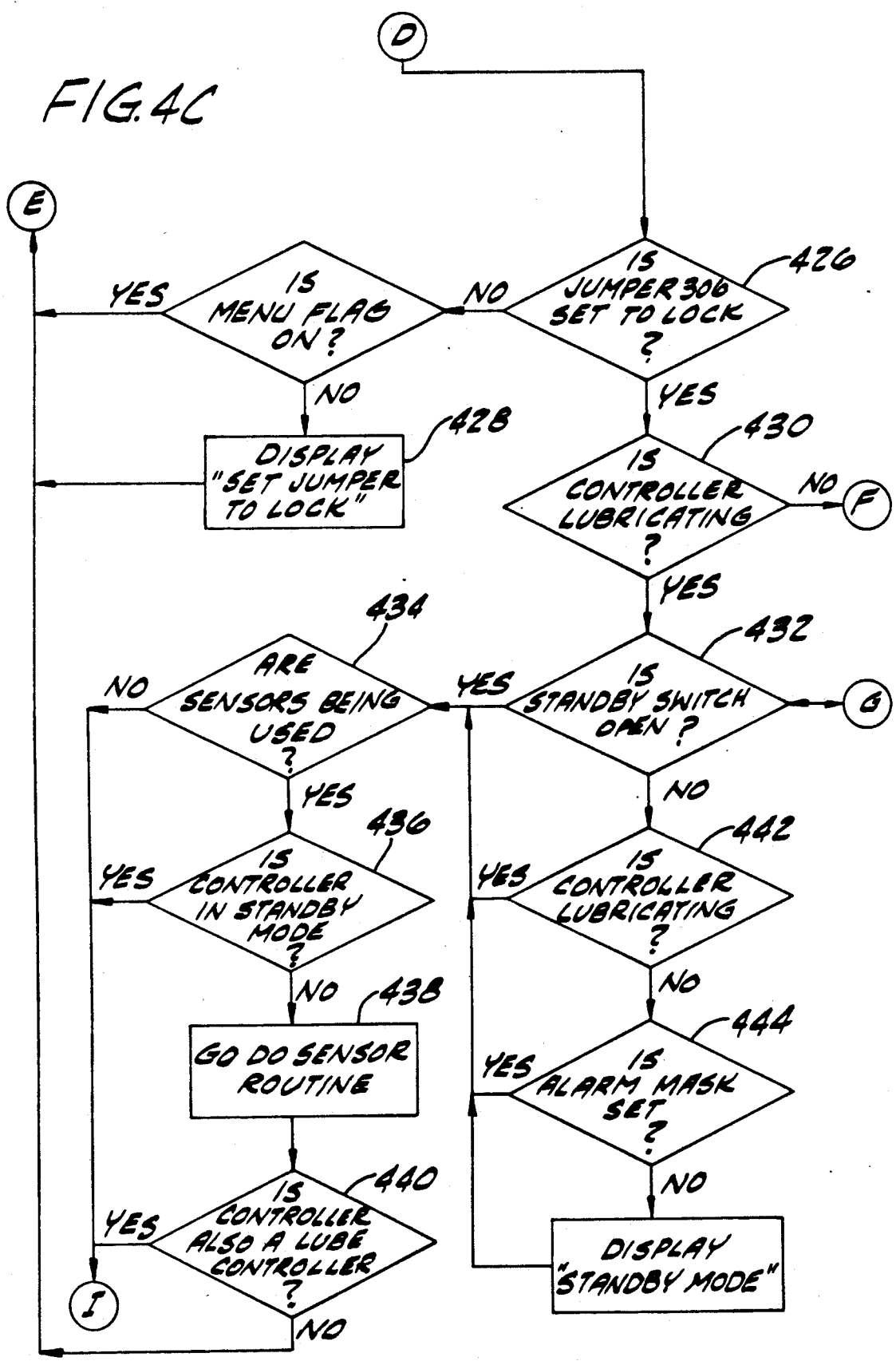

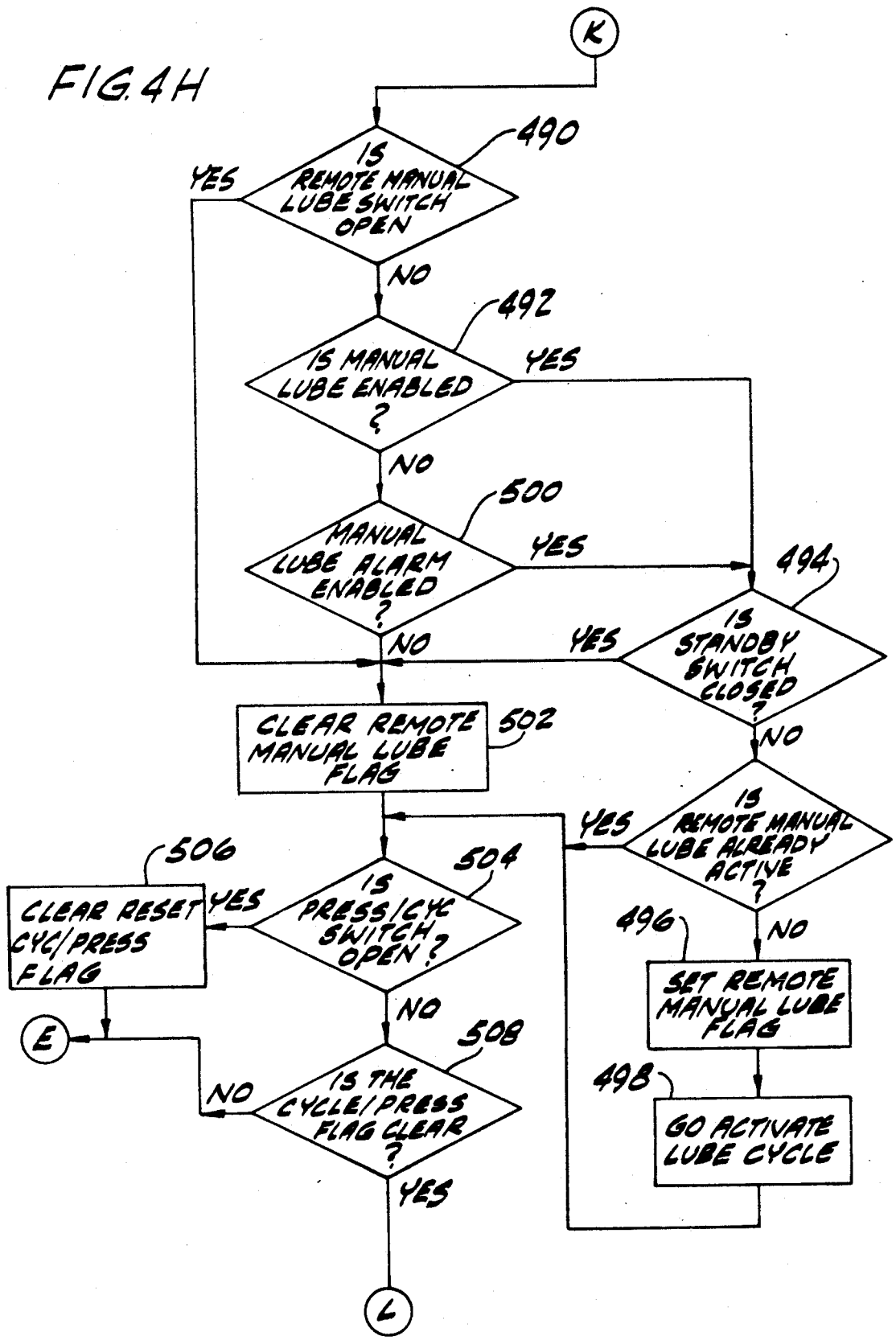

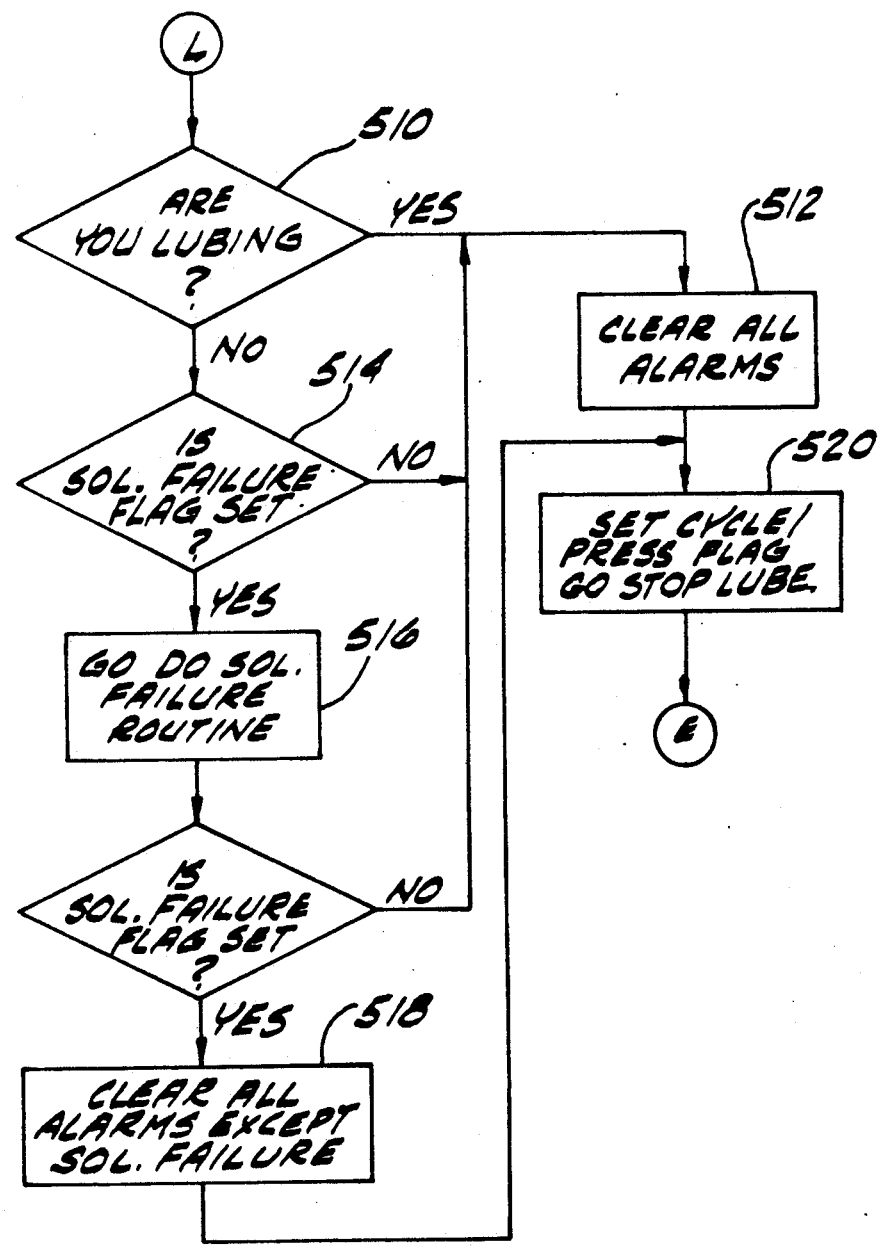

APPARATUS FOR CONTROLLING AND MONITORING A LUBRICATING SYSTEM

This is a continuation of co-pending application Ser. No. 07/623,205 filed on Dec. 6, 1990 now abandoned.

BACKGROUND OF THE INVENTION

The invention generally relates to fluid flow monitors and fluid flow controls, and more particularly to an apparatus for monitoring and controlling intermittent flow of lubricant by a lubricating system.

In order to maintain the efficient and prolonged operation of bearings in a machine effective lubrication of the bearings is required. It is important to both control periodic lubrication of the machine by the lubricating system according to frequency of use and to monitor machine lubricating events by the lubricating system in order to maintain an effective lubrication schedule and in order to provide an indication of whether the bearings are being properly lubricated.

One system that has been proposed for monitoring fluid flow is disclosed in Cook, U.S. Pat. No. 4,642,614, incorporated herein by reference. This patent was concerned with a fluid flow monitoring system for monitoring intermittent flow of lubricant through lubricant lines. The monitoring system included signal lights for indicating to the operator the various conditions of the system. Each lubrication line had an associated red and green signal light. The red signal light indicating a fault condition in a line and the green signal light indicating a proper flow condition in the line. Although this monitoring system was entirely satisfactory in monitoring fluid flow, it had limited uses because it could not be programmed and it could not control the lubricating system. The invention disclosed herein relates in particular to an improved, microprocessor based monitor of the type disclosed in U.S. Pat. No. 4,642,614, in combination with a control for the lubricating system.

SUMMARY OF THE INVENTION

It is an object of the invention to provide an apparatus which monitors and/or controls the operation of a lubricating system.

It is another object of the invention to provide an apparatus for monitoring and controlling the operation of a lubricating system which detects short and open circuits.

It is another object of the invention to provide an apparatus for monitoring and controlling the operation of a lubricating system which is a microprocessor based apparatus.

It is another object of the invention to provide an apparatus for monitoring and controlling the operation of a lubricating system which is responsive to both analog and digital sensors.

In one form, the invention comprises an apparatus for controlling and monitoring a lubricating system having analog sensors and switches indicating the status of the lubricating system. Means, responsive to the analog sensors and switches, provides a plurality of digital sensing signals representative of the status of the lubricating system. Means including a nonvolatile memory stores instructions. Means responsive to an operator selects parameters and inputs the selected parameters into the nonvolatile memory of the storing means. Means processes the digital sensing signals in accordance with the parameters stored in the storing means. Means, responsive to the processing means, initiates lubrication of the lubricating system. Means, responsive to the processing means, indicates the status of the lubricating system.

Other objects and features will be in part apparent and in part pointed out hereinafter.

BRIEF DESCRIPTION OF THE DRAWINGS

FIG. 2B is a plan view of the face plate of the control panel of the controller and monitor according to the invention.

FIGS. 3A, 3B and 3C are schematic illustrations of the controller and monitor according to the invention for a lubricating system.

FIGS. 4A–4I are a flow chart of the operation of the microprocessor of the controller and monitor according to the invention for a lubricating system.

Corresponding reference characters indicate corresponding parts throughout the several views of the drawings.

DETAILED DESCRIPTION OF THE PREFERRED EMBODIMENT

Figure 1:
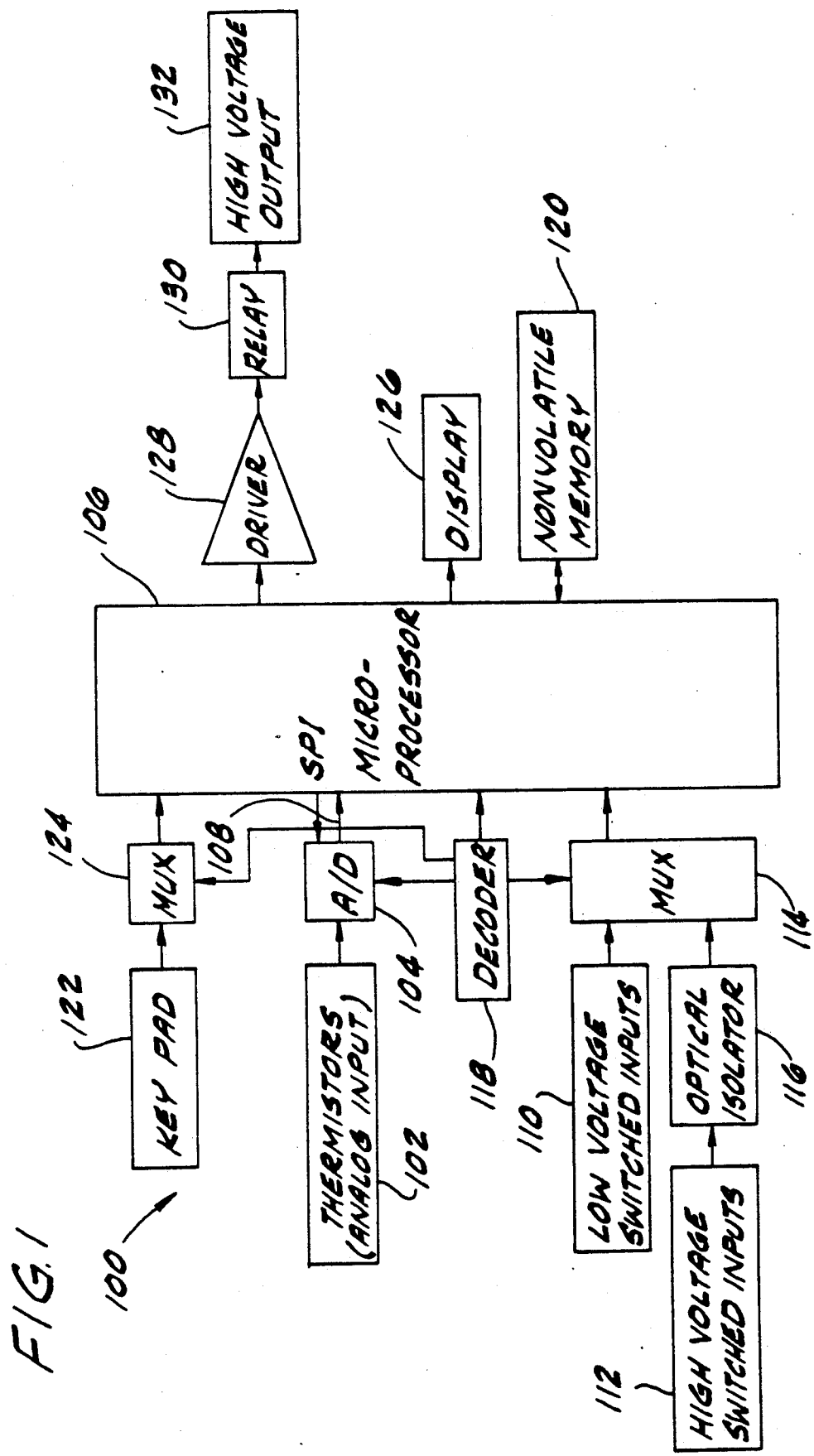
FIG. 1 is a block diagram of the controller and monitor according to the invention for a lubricating system.

Referring to FIG. 1, a block diagram of the apparatus according to the invention is illustrated. In general, the apparatus 100 controls a lubricating system (not shown) and monitors the lubrication points, such as bearings, (not shown) to confirm lubricant flow. In general, such lubrication flow is monitored by thermistors 102 which are located in the lubricant line and which respond to the lubricant flow by changing temperature which causes a change in resistance. This change in resistance generates a change of voltage signal that is provided to analog-to-digital converter 104 for generating a plurality of digital sensing signals provided to microprocessor 106 via line 108.

Additionally, the lubricating system may have low voltage switched inputs 110 and/or high voltage switched inputs 112 which indicate the status of the lubricating system or the system being lubricated. These switches generally generate low or high voltage signals representative of lubricating system status. The low voltage switched inputs 110 are provided to a multiplexer 114. The high voltage switched inputs 112 are provided via an optical isolator 116 to a multiplexer 114. The multiplexed switched signals are detected by microprocessor 106 by controlling multiplexer 114 via decoder 118.

Microprocessor 106 operates in accordance with a program stored in a nonvolatile memory 120 and permits the operator to select parameters which control the function of the apparatus 100. The operator selects the parameters by using the key pad 122 which is read by microprocessor 106 via multiplexer 124 controlled by decoder 118. The steps involved in the selection process and the particular parameters, which are described in detail below, are displayed by display 126. Depending on the parameters selected by the operator, microprocessor 106 provides an initiation signal to driver 128 for activating relay 130 which provides a high voltage output 132 for initiating activation of the lubricating system. As a result, the status of the lubricating system is constantly being updated and displayed on display 126. Due to the numerous options available in software, the operator can field program the apparatus 100 of the invention to match the particular lubricating system requirements and to match the requirements of the systems being lubricated. Programming is accomplished by following a user friendly menu, as described below, displayed on the display 126 and by depressing the switches of key pad 122.

Figure 2A:
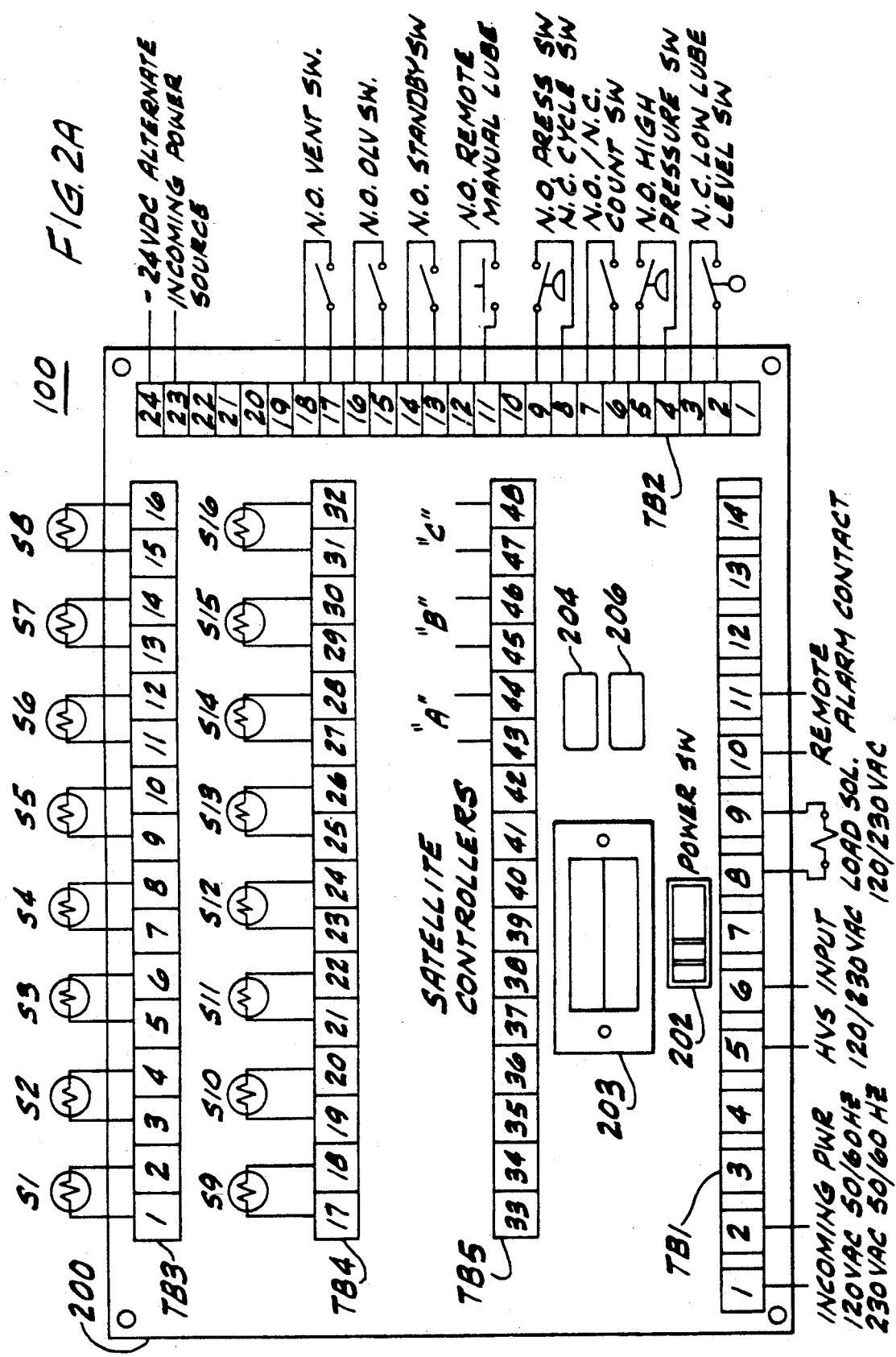
FIG. 2A is a schematic diagram illustrating field wiring of the controller and monitor according to the invention for a lubricating system.

FIG. 2A illustrates a field wiring label 200 of the apparatus 100 according to the invention. Included on the wiring label 200 are five terminal blocks TB1–TB5, a power switch 202, transformer 203 and two relays 204 and 206. Terminal block 1 (TB1) includes terminals 1 and 2 for connecting to the power supply, terminals 5 and 6 for connecting to the high voltage switched (HVS) input, terminals 8 and 9 for connecting to the load solenoid which initiates actuation of the pump of the lubricating system to generate a lubricating event and terminals 10 and 11 for connecting to an external or remote alarm to indicate a malfunction in the lubricating system operation. Terminals 5 and 6 receive the high voltage switched inputs 112.

Terminal block 2 (TB2) is for connection to the low voltage switched inputs 110. In particular, terminals 2 and 3 are connected to a normally open switch (SW) which closes to indicate a low lubrication level. Terminals 4 and 5 are connected to a normally open switch which closes to indicate excessively high pressure in the lubricating system. Terminals 6 and 7 are connected to a normally open switch or a normally closed switch which changes state by closing or opening, respectively, to initiate a lube event after a preset number of counts have been reached. Terminals 8 and 9 can be connected to either a normally open switch which closes to indicate a cycle in response to a pressure change or a normally closed switch which opens to indicate a cycle of the lubricating system. Terminals 11 and 12 are connected to a normally open remote switch which, when closed, initiates manual operation of the lubricating system. Terminals 13 and 14 are connected to a normally open switch which when closed places the apparatus 100 in a standby mode. Terminals 15 and 16 are connected to an optional low voltage (OLV) normally open switch which closes to indicate a changed condition. Terminals 17 and 18 are connected to a normally open switch which should open and close during each cycle to confirm proper venting. Terminals 23 and 24 can be connected to a 24 volt dc (VDC) incoming power source which may be used in place of terminals 1 and 2 of TB1.

Terminal blocks 3 and 4 (TB3 and TB4) are connected to thermistors S1–S16 for monitoring lubrication flow within the lubricating system. Terminal block 5 (TB5) may be connected to other satellite controllers A, B, C, similar to apparatus 100 so that these controllers operate in a coordinated manner, as will be described in greater detail below.

Referring to FIG. 2B, the face plate of the control panel includes display 126, keypad 122 including switches 122A, 122B, 122C and 122D and green, amber and red light emitting diodes G, A, R to indicate power, pump and alarm conditions, respectively.

Figure 3A:
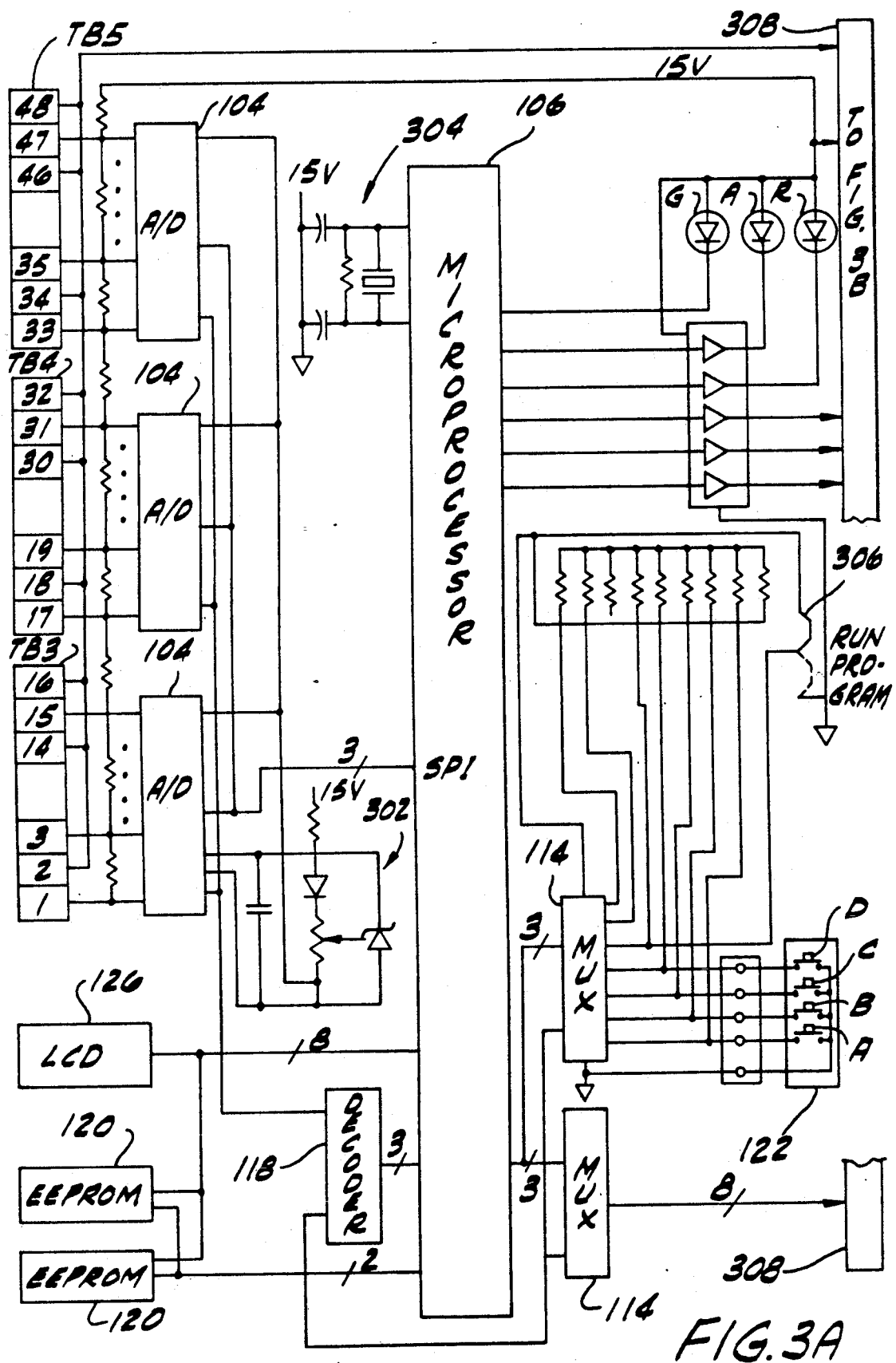

Referring to FIGS. 3A, 3B and 3C, a schematic diagram of the apparatus 100 is illustrated. Microprocessor 106 reads the status of the thermistors S1–S16 connected to blocks TB3 and TB4 and satellite controllers connected to block TB5 via its serial peripheral interface (SPI) which is supplied with digital signals from a bank of A/D converters 104. These converters 104 as well as the multiplexer 114 are controlled by decoder 118. For clarity, only a single control line has been drawn between these blocks to maintain simplicity within the schematic diagram. Each of the thermistors S1–S16 is connected across a 15 volt dc power source so that microprocessor 106 can monitor the voltage of the thermistors and detect any changes in voltage therein. Each of the converters 104 is powered by a power supply 302. The microprocessor is timed by a clock 304. The microprocessor includes internal memory having a program controlling its operation. FIGS. 4A–4I, described below, illustrate the programmed operation of the microprocessor.

Apparatus 100 may include three light emitting diodes (LED) for indicating the status of the apparatus. A green light emitting diode G is illuminated via the microprocessor 106 to indicate that power is being supplied to the apparatus 100 and that the apparatus 100 is active. An amber light emitting diode A is illuminated via the microprocessor 106 during lubrication cycles to indicate that a lubrication event is in progress. A red light emitting diode R is illuminated by microprocessor 106 to indicate that a fault has occurred and an alarm condition exists. As shown in FIG. 3A, the key pad 122 includes four switches 122A, 122B, 122C, 122D. However, it is contemplated that the key pad may include any other switch combination well known in the art. Furthermore, apparatus 100 includes an internal jumper pin 306 shown in the run position. This pin provides security against unauthorized programming. The EEPROMs 120 cannot be programmed with parameter information unless pin 306 is in the program position.

Terminal connector 308 of FIGS. 3A and 3C is connected to terminal connector 310 of FIG. 3B. As shown in FIG. 3B, the apparatus 100 includes a power supply 309 for generating a 15 volt dc signal. Terminals 5 and 6 of terminal block TB1 are connected to optical isolator for indicating through multiplexer 114 to microprocessor 106 the status of the high voltage switch (HVS) input.

Terminals 8 and 9 of terminal block TB1 are responsive to load relay 312 controlled by the microprocessor 106. When a lubrication event is required, microprocessor 106 provides a signal to close the contacts of load relay 312 thereby energizing the load solenoid. Terminals 10 and 11 of terminal block 1 are controlled by alarm relay 314 which is responsive to microprocessor 106 to close its contacts in the event of an alarm condition. Terminals 13 and 14 are responsive to optional relay 316, if a separate function of the lubricating system is to be controlled by microprocessor 106 in response to certain programmed conditions or certain programmed parameters. Each of the relays includes a varistor surge protector 318 to prevent sparking across the contacts and is responsive to a control relay CR actuated by the microprocessor 106.

Referring to FIGS. 4A–4I, operation of the apparatus 100 (referred to as a "controller" in these figures), and particularly operation of the microprocessor 106, will be described by reference to the flow charts of these figures. After initialization at step 400, all ports are scanned and set up by step 402. If the timer flag has been set to indicate a change in timing, step 404 updates the timers. If the controller is operating in a count mode rather than a timing mode, terminals 13 and 14 of terminal block TB2 are checked to determine the status of the standby switch by step 406. If the standby switch is closed indicating that the controller is in a holding mode, microprocessor 106 proceeds to step 408 to read switches A, B, C, D and P. If the standby switch is open indicating an active condition, step 410 confirms that the controller has been set up, or step 412 confirms that the controller is in review. If the controller is not in set up or review, the count switch is serviced and the five counters are serviced. Thereafter, if the count switch is still active, the microprocessor 106 returns to set up the ports again at step 402. When it is determined by step 414 that the count switch is no longer active, microprocessor 106 executes the reading of switches A, B, C, D and P at step 408. The customer switches connected to terminal block TB2 are then read by step 416, switches C and D are checked and the power line is checked.

If the test flag has been set requiring a test of the microprocessor, the test routine is executed by step 418. If the menu flag has been set requesting a change in the menu, the menu routine is executed by step 420. If the setup flag has been set indicating a change in the setup, the setup and review routine is executed by step 422. If the review flag has been set requiring a review, the setup and review routine is executed by step 424.

Proceeding to line D of FIG. 4C, microprocessor 106 checks the jumper 306 to see if it is locked in the run position by step 426. If it is not and the menu flag is on, the microprocessor 106 returns to set up the ports at step 402. Otherwise, at step 428, the set jumper to lock command is displayed and the microprocessor returns to set up the ports by step 402.

If the jumper 306 is in the run position, at step 430 the microprocessor 106 considers whether the controller is lubricating. If it is, the standby switch is checked at 432. If the standby switch is open so that no standby condition exists, the sensors are checked by step 434; the standby switch is again checked by step 436; the sensor routine is executed by step 438. If the controller is only being used as a monitor, step 440 returns the microprocessor to set up the ports at step 402. Otherwise, the microprocessor proceeds to line I of FIG. 4F. On the other hand, if the standby switch is closed at step 432, "standby mode" is displayed if the controller is not lubricating at step 442 and no alarm mask has been set at step 444. In summary, referring back to step 430, if the controller is lubricating, the microprocessor will proceed to line I of FIG. 4F when the apparatus is in standby mode. Otherwise, the microprocessor will return to step 402 via line E to set up the ports. If the controller is not lubricating, the subroutines of FIGS. 4D and 4E will be executed beginning with line F from step 430 and ending with line G returning to step 432.

Figure 4A:
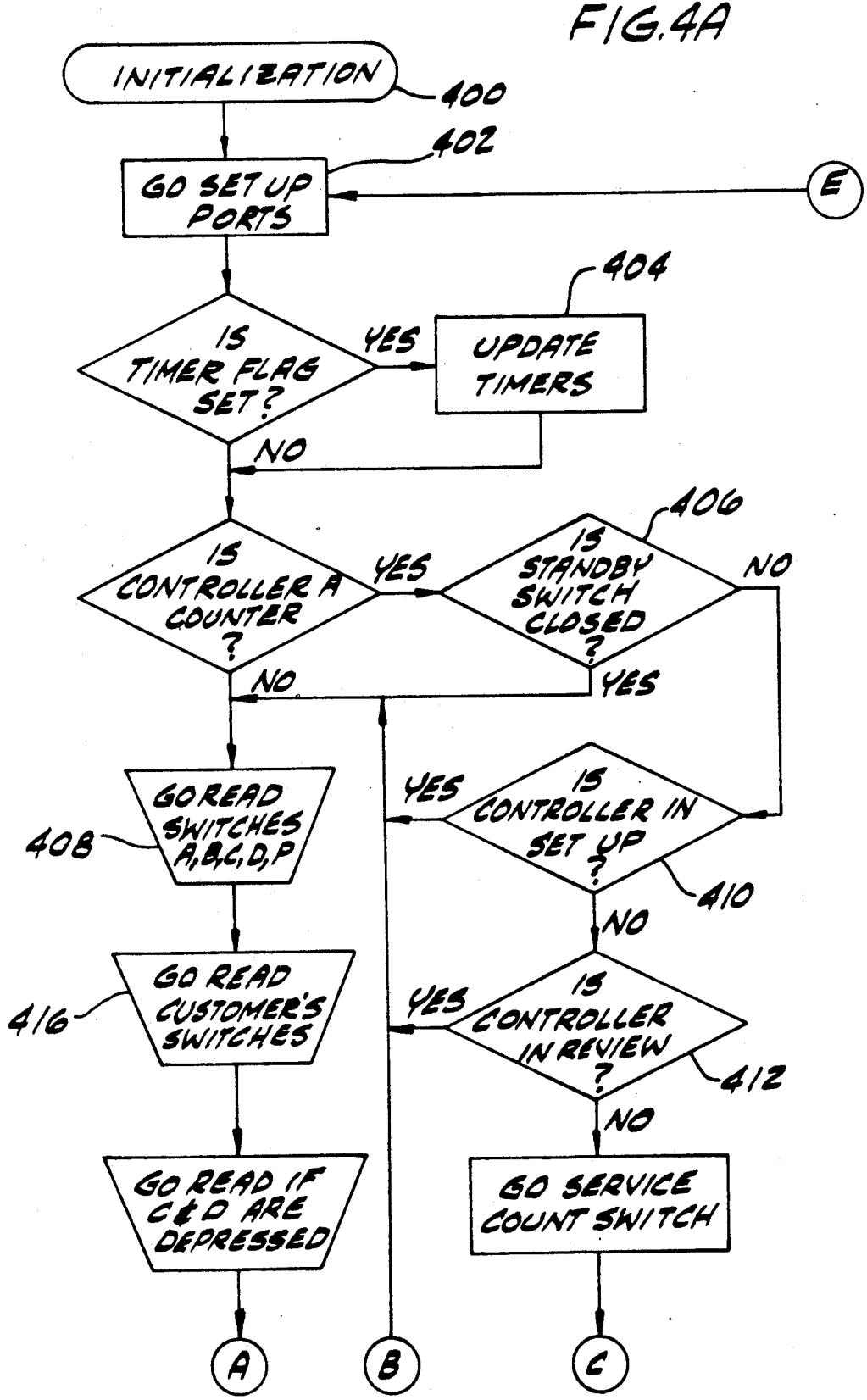
Figure 4B:
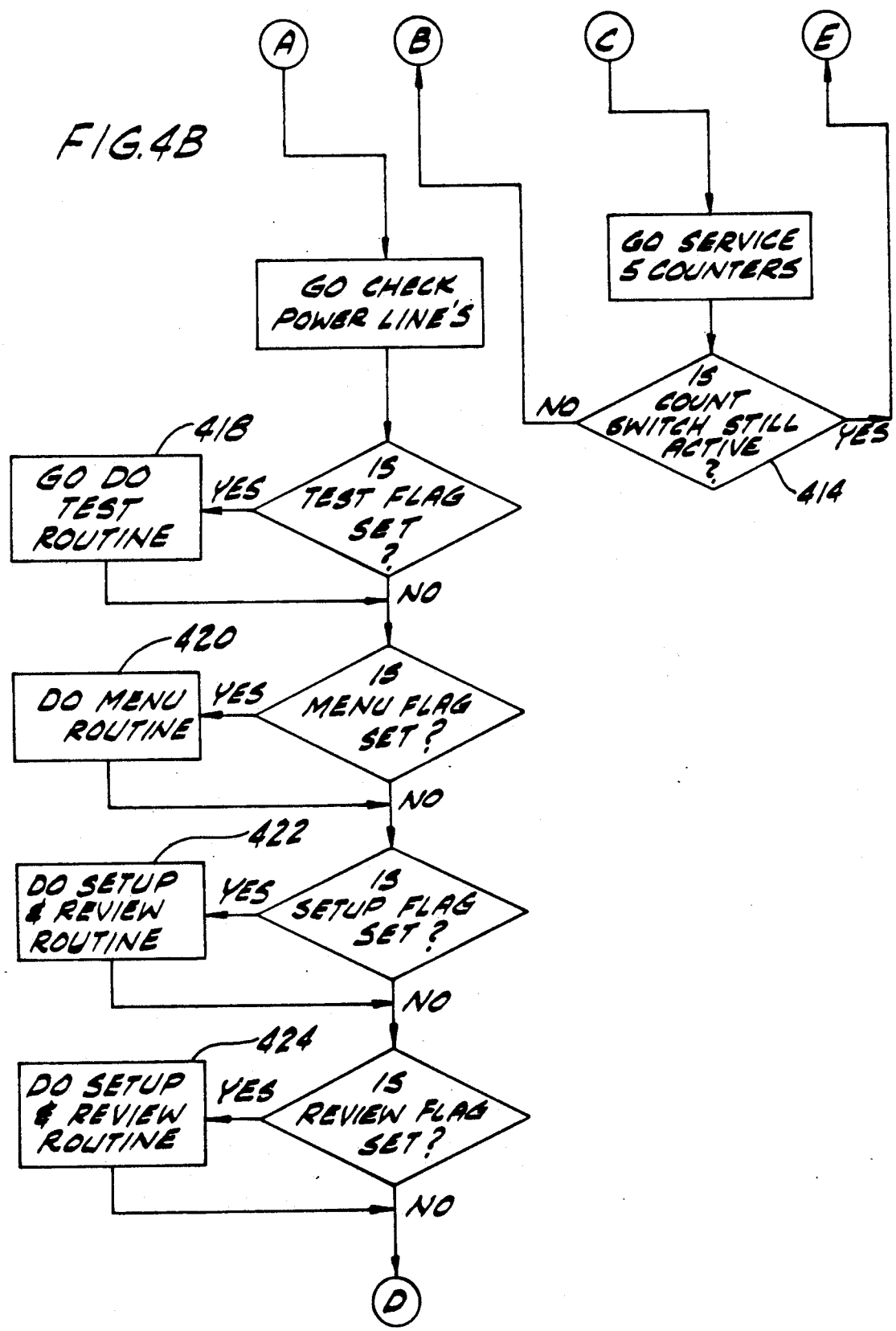
Figure 4D:
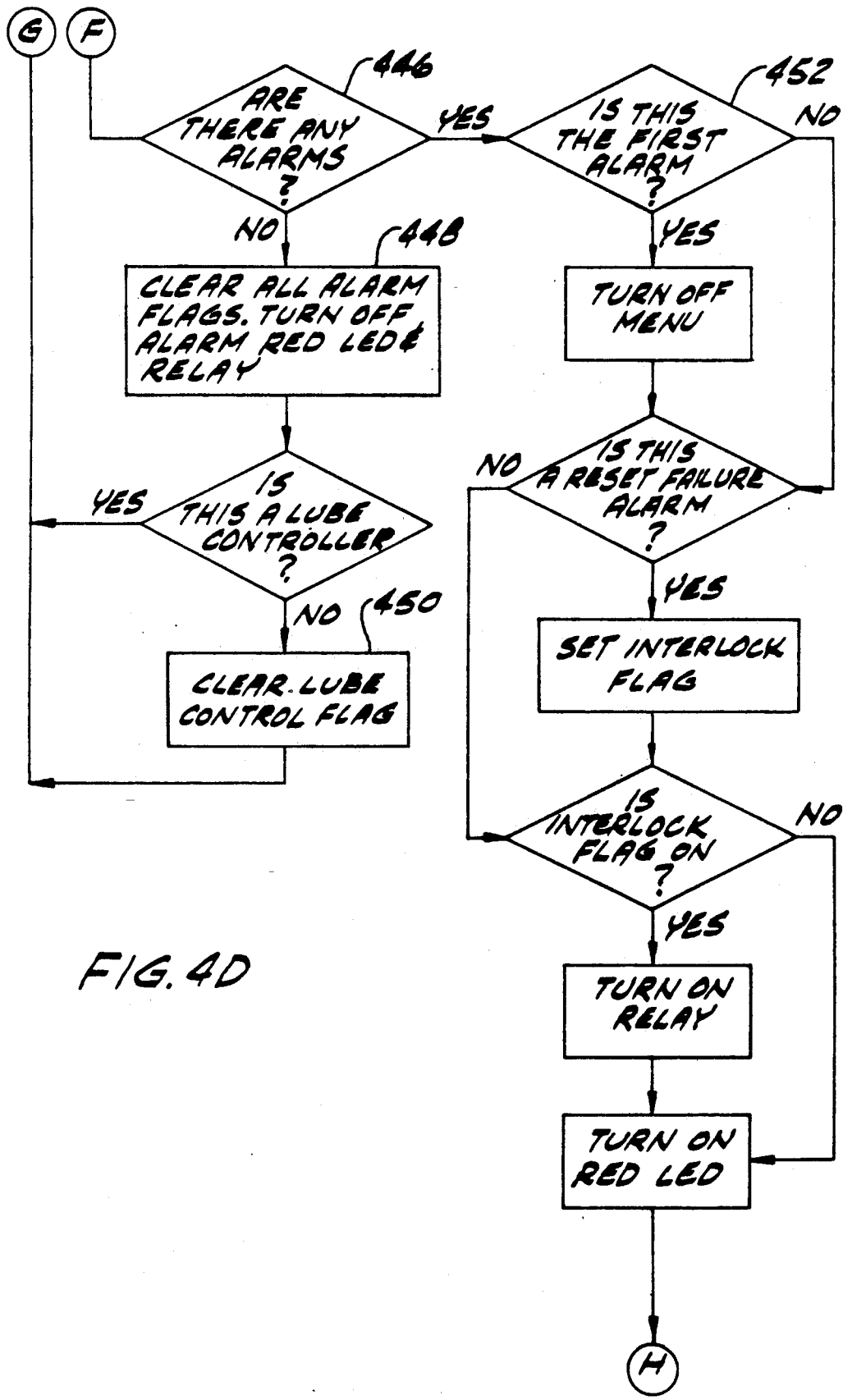

Referring to FIG. 4D, step 446 considers whether there are any alarms. If none exist, step 448 clears all alarm flags, turns off the red alarm LED, step 450 clears the lube control flag if the controller is not a lube controller and the microprocessor returns to step 432 of FIG. 4C.

If step 446 determines that there is an alarm, the type of alarm is evaluated by step 452 and its succeeding subroutine. If this is the first alarm, the menu is turned off. If it is a reset failure alarm, the interlock flag is set to turn on the red alarm LED.

Figure 4E:
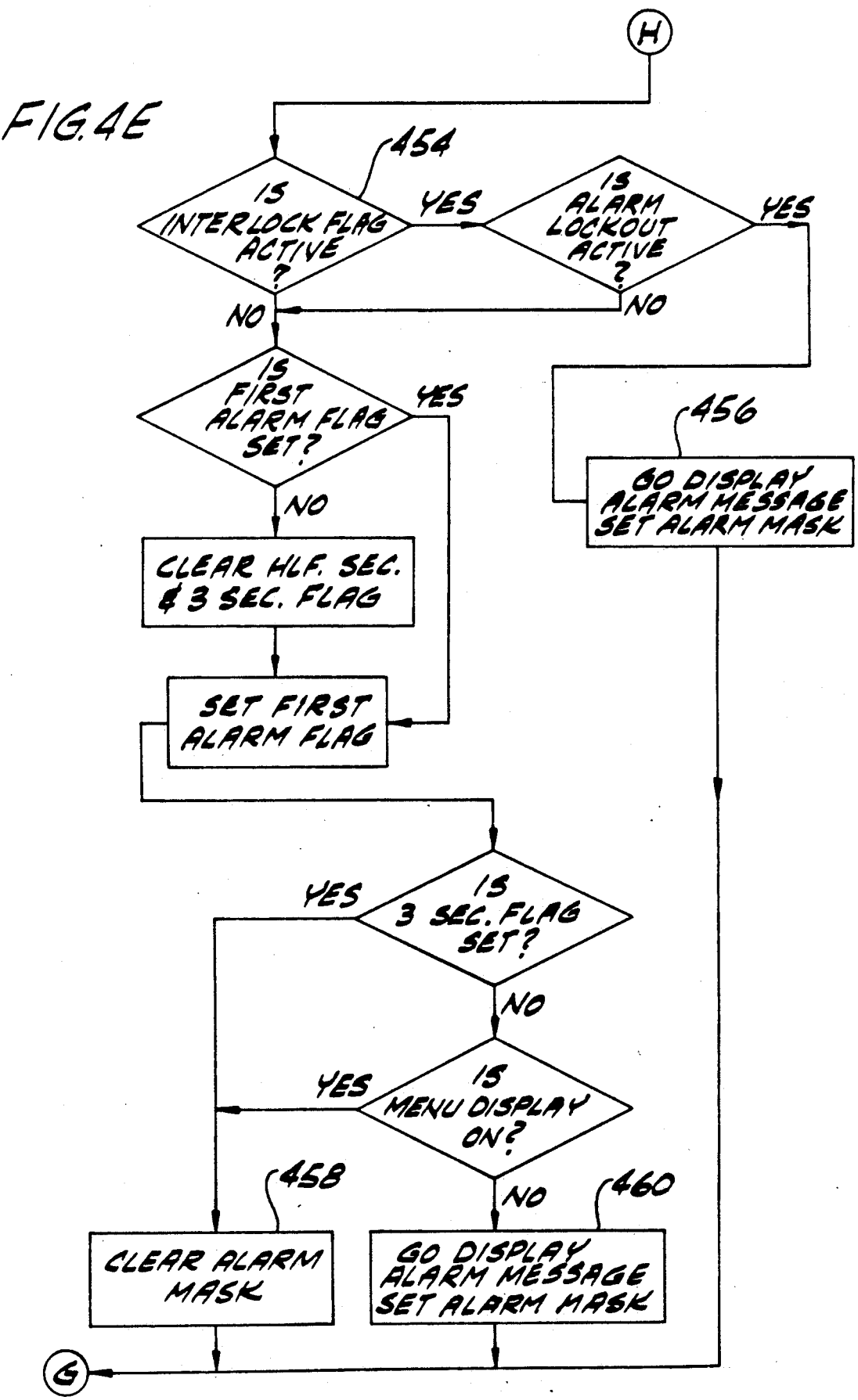

Proceeding to FIG. 4E at line H, if the interlock flag is active at step 454, and the alarm lockout is active for the particular arm which is set, an alarm message is displayed by step 456 and the program returns to step 432 of FIG. 4C via line G. Otherwise, step 454 sets the first alarm flag. The alarm mask is cleared by step 458 unless the three second flag has been set or the menu display is not on, in which case step 460 displays an alarm message. In either case, the program returns to step 432 of FIG. 4C via line G.

Figure 4F:
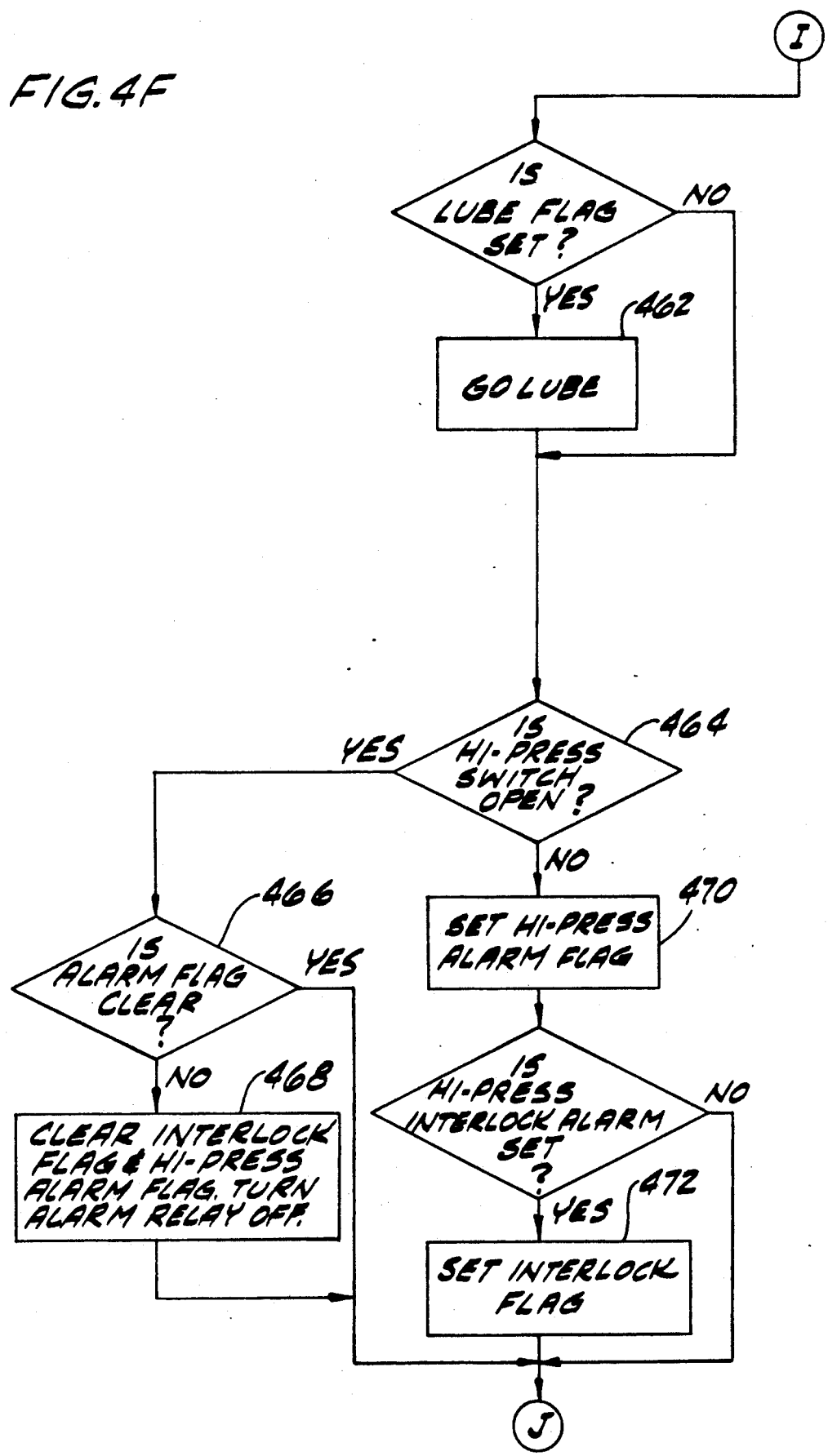

Proceeding at line I of FIG. 4F, microprocessor 106 executes a lubrication cycle at step 462 if the lube flag has been set. In other words, load relay 312 is activated to close the load contacts and actuate the load solenoid and pump to begin a lubrication event. If step 464 determines that the high pressure switch is open so that a high pressure condition does not exist, the alarm flag is considered by step 466. If it is clear, microprocessor 106 clears the interlock flag and high pressure alarm flag and turns off the alarm relay by step 468. Otherwise, the high pressure alarm flag is set by step 470. If the high pressure interlock alarm has been set, step 472 sets the interlock flag.

Figure 4G:
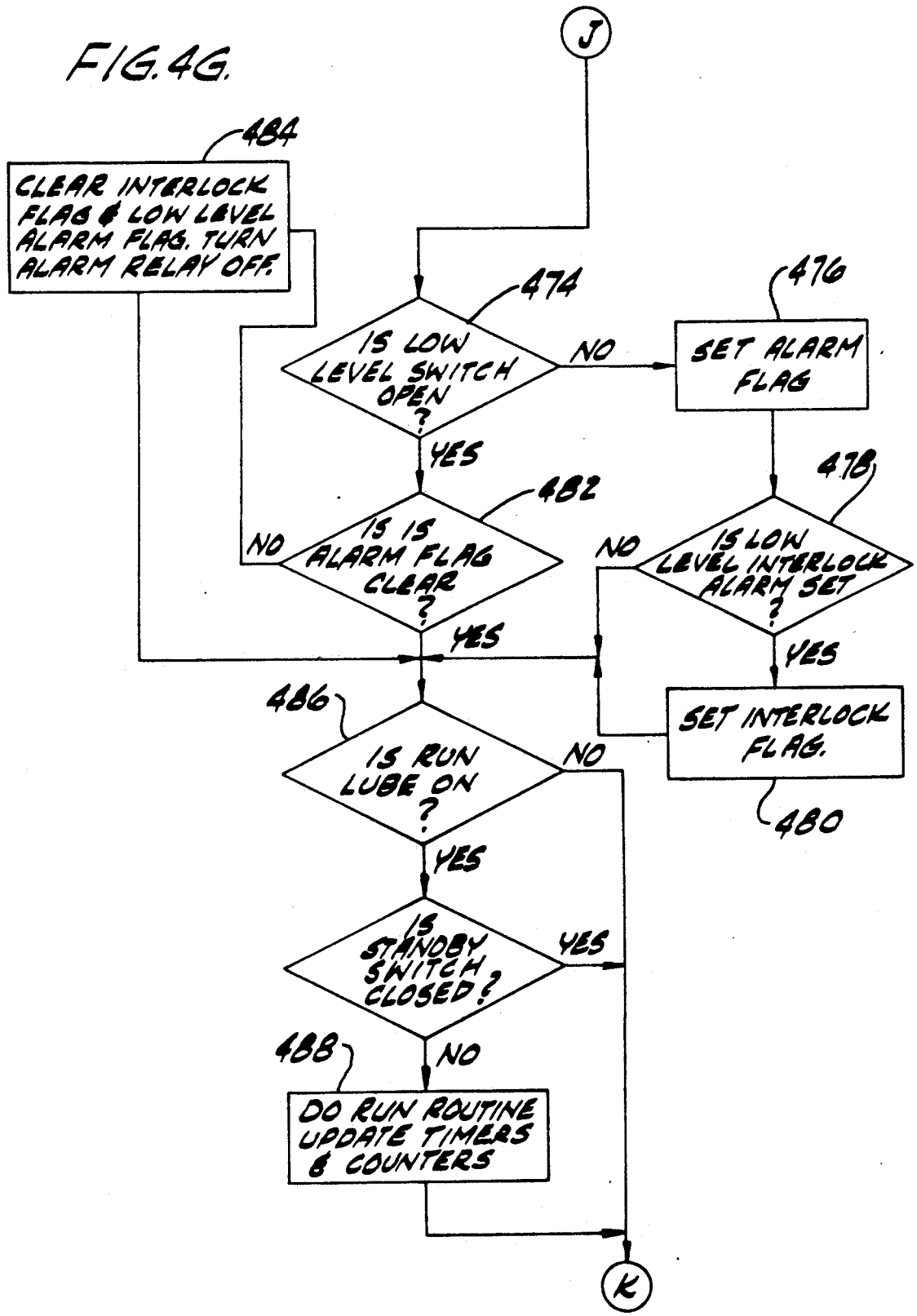

Proceeding to line J of FIG. 4G, microprocessor 106 considers the low lubricant level switch on terminals 2 and 3. If it is closed indicating a low lubricant level, step 476 sets the low level alarm flag. If the low level interlock alarm has been set at step 478, the interlock flag is set by step 480. Otherwise, if step 482 determines that the alarm flag is not clear, the interlock flag and low level alarm flags are cleared and the alarm relay is turned off by step 484. The microprocessor 106 then proceeds to step 486. If the lubrication run is in progress, and the standby switch has not been closed, the run routine is executed to update the timers and the counters by step 488. Otherwise, the microprocessor 106 proceeds to line K of FIG. 4H. If the remote manual lube switch on terminals 11 and 12 has been closed, step 490 proceeds to step 492. If the manual lube has been enabled, the standby switch is checked by step 494. If the manual lube is already active, step 496 sets the manual lube flag, step 498 activates the lube cycle and the subroutine proceeds. Otherwise, assuming that the manual lube alarm has not been enabled, as determined by step 500, the remote manual lube flag is cleared by step 502 and the pressure/cycle switch is checked by step 504. If the switch is open, the reset is cleared by step 506 and the program returns to step 402 via line E to set up the ports. This also occurs if the cycle/pressure flag has not been cleared as determined by step 508.

Otherwise, the program proceeds to line L of FIG. 4I. If the lubricating system is lubricating, which is indicated by receiving the appropriate inputs from all the thermistors, all alarms are cleared by step 512. Otherwise, the solenoid failure flag is checked by step 514. If it has been set, the solenoid failure routine is executed by step 516 in which case all alarms except the solenoid failure alarm are cleared by step 518. The cycle/pressure flag is set by step 520 to stop lubrication and the program returns to step 402 via line E to set up the ports.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for controlling and monitoring a lubrication of a system having analog sensors detecting lubrication events and switches indicating a status of a lubricating system having vents, an oil level, a pressure and a cycle, said apparatus comprising:

means, responsive to the analog sensors and switches, for providing a plurality of digital sensing signals representative of lubrication events and of the status of the lubricating system;

means, including a nonvolatile memory, for storing instructions;

means, responsive to an operator, for selecting operating parameters of the lubricating system;

means for inputting the selected parameters into the nonvolatile memory of the storing means;

means for processing the digital sensing signals by comparing the digital sensing signals to the selected parameters stored in the storing means;

means, responsive to both the providing means and the processing means, for initiating lubrication events by the lubricating system; and means, responsive to the processing means, for indicating the status of the lubricating system, the processing means operating in a review mode as selected by the operator via said inputting means in which selected parameters are displayed by the indicating means.

2. The apparatus of claim 1 wherein the analog sensors comprise thermistors connected to a voltage source and wherein the processing means monitors a voltage increase as a function of time on the thermistors.

3. The apparatus of claim 2 wherein the thermistors are adjacent a lubricant line to detect lubricant flow through the lubricating system and wherein the processing means monitors changes in the voltage level on the thermistors and compares the monitored changes to a predetermined minimum voltage difference whereby a voltage increase greater than the minimum voltage difference indicates that lubricant has been delivered by the lubricating system.

4. The apparatus of claim 2 wherein the processing means further comprises means for detecting an open or short circuit connected to each of the thermistors.

5. The apparatus of claim 4 wherein the detecting means comprises means for comparing the voltage level on each thermistor to a preset minimum voltage thereby indicating a short circuit when the voltage level is less than the preset minimum voltage and for comparing the voltage level on each thermistor to a preset maximum voltage thereby indicating an open circuit when the voltage level is greater than the preset maximum voltage.

6. The apparatus of claim 1 further comprising means for electrically isolating at least one of the switches from the processing means.

7. The apparatus of claim 6 wherein the isolating means comprises an optical isolator.

8. The apparatus of claim 1 further comprising means for converting signals from the analog sensors into digital signals which are provided to the processing means.

9. The apparatus of claim 1 further comprising a housing including a door for enclosing said apparatus, wherein the inputting means comprises a keypad on the door providing keypad signals to the processing means in response to an operator and wherein the parameters stored in the nonvolatile memory include parameters selected by the operator via keypad signals.

10. The apparatus of claim 9 wherein the processing means comprises a display and wherein the processing means displays a menu of parameters to be selected by the operator.

11. The apparatus of claim 9 further comprising means for multiplexing the keypad signals so that multiplexed keypad signals are provided to the processing means.

12. The apparatus of claim 1 further comprising means for multiplexing the digital sensing signals so that multiplexed digital sensing signals are provided to the processing means from the switches.

13. The apparatus of claim 1 wherein the indicating means comprises a display.

14. The apparatus of claim 13 wherein the processing means includes means for detecting an alarm condition and wherein the processing means displays on the display the detected alarm conditions.

15. The apparatus of claim 1 wherein the nonvolatile memory comprises an EEPROM.

16. The apparatus of claim 1 wherein the initiating means comprises a relay for controlling the lubricating system and means for driving the relay in response to signals provided by the processing means.

17. The apparatus of claim 16 wherein the relay comprises a pump solenoid relay for controlling a pump of the lubricating system.

18. The apparatus of claim 16 wherein the relay comprises an alarm relay for actuating an alarm.

19. The apparatus of claim 18 wherein the processing means actuates the alarm after detecting a preset number of events indicating a failure.

20. The apparatus of claim 1 wherein the processing means operates in a program mode in which parameters are selected by the operator and in a run mode in which the digital sensing signals are processed in accordance with the selected parameters.

21. The apparatus of claim 20 further comprising means for inhibiting the program mode.

22. The apparatus of claim 1 wherein the processing means comprises means for counting the number of lubrications initiated by the initiating means.

23. The apparatus of claim 1 wherein the processing means further comprises means for connecting to another of said apparatus and means for displaying a status of the other apparatus.

* * * * *